United States Patent [19]

Grallert

[11] Patent Number: 5,095,482

[45] Date of Patent: Mar. 10, 1992

[54] METHOD OF AND APPARATUS OF INDIVIDUALLY MONITORING TRANSMISSION SECTIONS OF A COMMUNICATIONS TRANSMISSION LINK

[75] Inventor: Hans-Joachim Grallert, Groebenzell, Fed. Rep. of Germany

[73] Assignee: Siemens Aktiengesellschaft, Munich, Fed. Rep. of Germany

[21] Appl. No.: 449,759

[22] Filed: Dec. 13, 1989

[30] Foreign Application Priority Data

Dec. 23, 1988 [EP] European Pat. Off. .......... 88121580

[51] Int. Cl.$^5$ .............................................. G06F 11/10
[52] U.S. Cl. ......................................... 371/3; 371/20.5; 371/49.1
[58] Field of Search ................ 371/3, 20.2, 20.4, 20.5, 371/49.1; 370/13.1, 15; 375/3.1; 379/4; 455/9, 10

[56] References Cited

U.S. PATENT DOCUMENTS

| | | | |
|---|---|---|---|
| 3,950,622 | 4/1976 | Taylor | 370/13.1 |
| 4,397,020 | 8/1983 | Howson | 370/105 |
| 4,441,185 | 4/1984 | Jungmeister | 371/3 X |
| 4,494,717 | 1/1985 | Corrie | 371/3 X |
| 4,688,207 | 8/1987 | Yoshimoto | 371/3 X |
| 4,736,377 | 4/1988 | Bradley | 371/3 |
| 4,876,686 | 10/1989 | Sasaki | 371/3 X |

FOREIGN PATENT DOCUMENTS

| | | |
|---|---|---|
| 0179465 | 4/1986 | European Pat. Off. . |
| 0264879 | 4/1988 | European Pat. Off. . |
| 3004767 | 5/1981 | Fed. Rep. of Germany . |

OTHER PUBLICATIONS

Erlich W. et al., "Die Neu Synchrone Digitale Hierarchie", NTZ, vol. 41, No. 10, 1988, pp. 570-574.
"Background Information on the Use of Cyclic Redundancy Check (CRC) Procedures", Annex A, CCITT Recommendation G. 706, pp. 75-174.

Primary Examiner—Robert W. Beausoliel
Attorney, Agent, or Firm—Hill, Van Santen, Steadman & Simpson

[57] ABSTRACT

Method and apparatus for individually monitoring transmission sections of a communication transmission link, whereby auxiliary signals serving the purpose of bit error recognition are newly-calculated when they are regenerated. In order to be able to check monitoring circuits under remote control, the auxiliary signals in a test mode are formed in a manner different from that in a normal monitoring mode. The reception of a prescribed plurality of such auxiliary signals serves as criterion for the test mode.

11 Claims, 1 Drawing Sheet

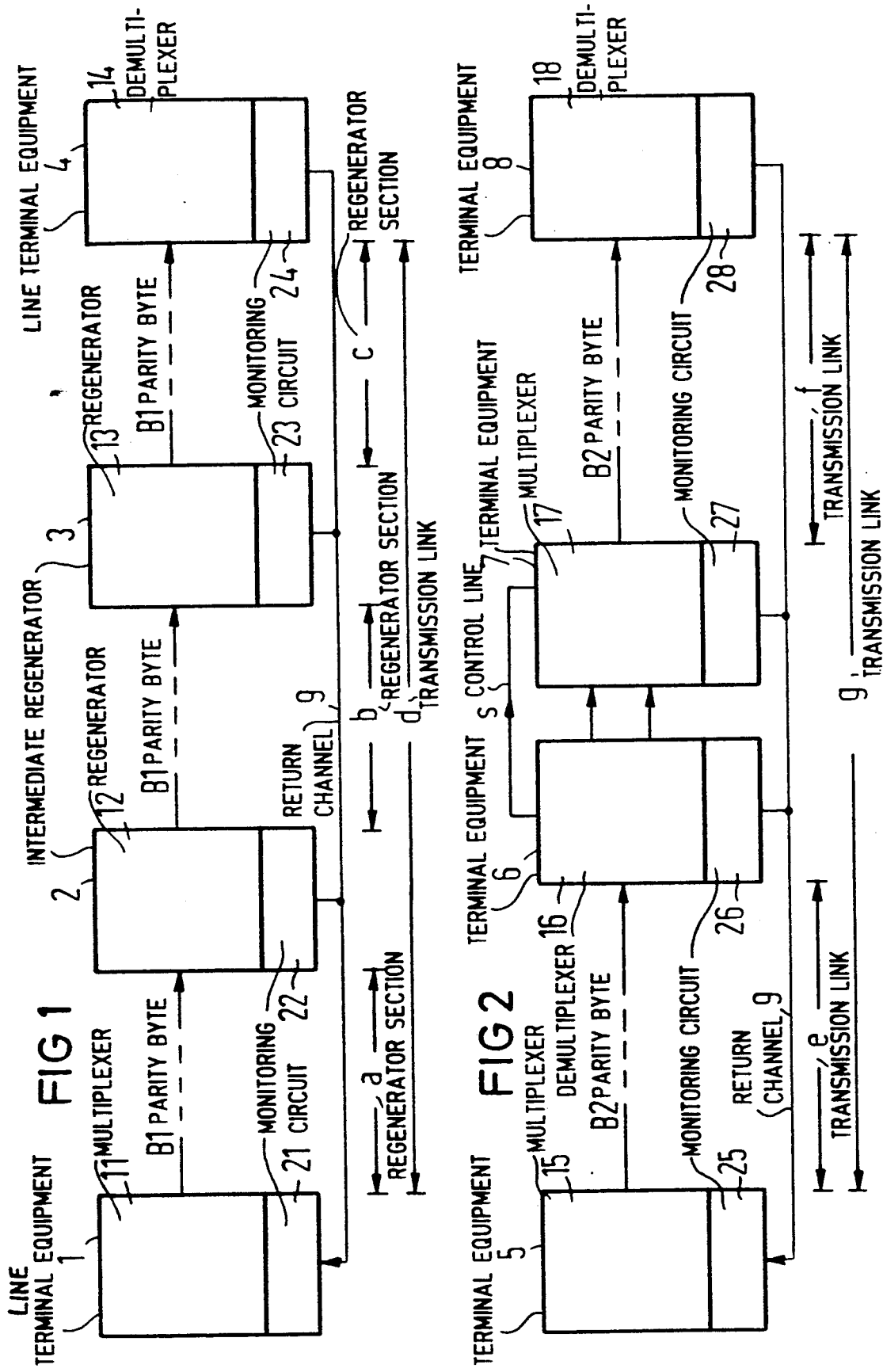

METHOD OF AND APPARATUS OF INDIVIDUALLY MONITORING TRANSMISSION SECTIONS OF A COMMUNICATIONS TRANSMISSION LINK

BACKGROUND OF THE INVENTION

1. Field of the Invention

The present invention relates to a method and to an apparatus for individually monitoring transmission sections of a communications transmission link for the transmission of digital useful signals, in which auxiliary signals formed according to a first formation rule are respectively derived from the useful signals at the start of the transmission sections and are inserted into the digital useful signals, in which comparison signals formed according to the first formation rule are derived from the received useful signals at the respective ends of the transmission sections and are compared to the received auxiliary signals, and error messages are formed with the assistance of monitoring circuits in a prescribed dependency on the result of the comparison.

2. Description of the Prior Art

A method of the type generally set forth above is known from the CCITT recommendations G707-G709 or from the German periodical NTZ, Vol. 41, No. 10, 1988, pp. 570-574. In the known method, byte-structured PCM signals are transmitted together with parity bytes. The parity bytes serve the purpose of identifying the bit error rate during the transmission. With respect to control, the parity from the bits of an entire frame or the sub-frame is formed and is then transmitted in the following frame or sub-frame. The parity byte is monitored and repeatedly formed by every intermediate regenerator. Errors in a transmission link can therefore be limited to the affected regenerator section. A further parity byte, of contrast, serves the purpose of bit error acquisition of a transmission link between two network nodes.

In the one parity byte is respectively newly formed at the beginning of the regenerator section and the further parity byte is respectively newly formed at the beginning of the transmission link, the regenerator sections or, respectively, transmission links can be individually monitored, so that errors in a transmission link can be limited to the affected regenerator section or, respectively, errors on a transmission path can be limited to the affected transmission link.

Further, it is known from the German periodical Telcom Report, Special, Multiplexing & Line Transmission, Vol. 10, Dec. 1987, pp. 107-112, to provide digital transmission systems with a means for inoperation monitoring. The intermediate regenerators each thereby respectively contain a monitoring circuit that monitors infringements of the code rule via the ongoing digital sum. Apart from error bursts, conclusions can thus be drawn concerning the bit error frequency at the appertaining location. What is referred to as the error quota is transmitted to the locating means in coded form. The bit error frequency at each individual regenerator is therefore acquired in the locating means. Conclusions concerning the transmission quality of the individual regenerator fields can be drawn in this fashion in a monitoring terminal on the basis of a comparison of the measured bit error frequencies, so that an individual monitoring of transmission selections is also possible.

When a bit error rate of zero is measured in the monitoring circuits given an error-free transmission of the digital signals, then the question arises, however, whether this measured result is based on an error-free transmission of the digital signals or on a faulty operation of the monitoring means. It can therefore prove expedient to undertake a checking of the monitoring means at least given the report of the bit error rate of zero.

The monitoring circuits can be checked in line equipment whose regenerators do not carry out any recalculation of the parity bytes or, respectively, any error correction in that defined code errors are arbitrarily mixed in at the beginning of the transmission link, these not falsifying the useful signals or, respectively, useful bytes. In this case, the bit errors resulting from the defined code errors are recognized and displayed in every regenerator as well as in the line terminal equipment of the receiving side, this enabling the checking of the monitoring equipment. However, a comparison of bit error rates is required for individual monitoring of transmission sections.

In a monitoring device of the type initially set forth wherein auxiliary signals are respectively derived from the useful signals at the beginning of the transmission sections and are inserted into the digital useful signals, an individual monitoring of transmission sections is possible, in fact, by direct bit error measurement. However, the desired checking of the monitoring circuits cannot be undertaken by simply mixing in defined code errors.

SUMMARY OF THE INVENTION

An object of the invention is to provide a method and a practical apparatus for implementing the method that allows monitoring circuits to be checked under remote control in a transmission equipment having successive transmission sections wherein auxiliary signals are newly calculated when they are regenerated.

In a method of the type generally set forth above, that is a method for individually monitoring at least two successive transmission sections of a transmission link for the transmission of digital useful signals, in which auxiliary signals are formed according to a first formation rule and are respectively derived from the useful signals at the start of the transmission sections and are inserted into the digital useful signals and comparison signals are formed according to the first formation rule and are derived from the received useful signals at the respective ends of the transmission sections and are compared to the received auxiliary signals and error messages are formed with the assistance of the monitoring circuits in a prescribed dependency on the result of the comparison, the present invention is particularly characterized in that, for checking the error messages, a switch is undertaken from the first to a second formation rule for a prescribed duration in the derivation of the auxiliary signals at the start of at least two of the individually-monitored transmission sections for checking the error messages, and in that comparison signals, both according to the first formation rule and according to the second formation rule are derived at the end of at least one transmission section which precedes a further transmission section and are respectively compared to the received auxiliary signals, and in that, given identification of auxiliary signals derived according to the second formation rule, a switch to auxiliary signals formed according to the second formation rule is likewise made for a prescribed interval during a prescribed duration in the case of the digital signals to be transmitted via the following transmission section.

The features of the present invention yield the advantage that the transmission quality of the individual transmission segments can be identified independently of one another and, simultaneously, the monitoring of the individual monitoring circuits can be triggered from the end of the transmission link without employing an additional transmission channel.

The useful signals can be digital signals of an arbitrary type. The duration during which the second formation rule is valid can be a prescribed time interval.

In a transmission of PCM signals, it is expedient to select the duration of the transition onto the second formation rule such that the derivation auxiliary signals according to the second formation rule is respectively undertaken for the duration of a first, prescribed plurality of pulse frames, and in that the reception of a second, prescribed plurality of pulse frames having auxiliary signals of a second type serves as the criterion for the switch to the second formation rule in a following intermediate location.

An especially low expense derives when the auxiliary signals derived according to the first formation rule are parity bytes and the auxiliary signals formed according to the second formation rule are parity bytes that are usually inverted in a parity bytes. This is particularly true for PCM signal transmission equipment of the synchronous digital hierarchy as defined in CCITT recommendations G707, G708 and G709 and wherein apparatus for the insertion of parity bytes into the data stream are already provided.

In the desired checking of the monitoring circuits, one can proceed such that the impending check is pointed out by telephone via a service line, so that the measurement results indicated by the monitoring circuits can be observed on site and can be interpreted as test results.

When, according to another feature of the invention, the transition from the first to the second formation rule is initiated proceeding from a terminal to which error messages are transmitted, then the checking can be undertaken in a particularly simple manner. One advantageously proceeds such that, in a transmission link having bidirectional signal transmission, the parity bytes of the opposite direction are likewise formed according to the second formation rule given receipt of parity bytes formed according to the second formation rule at the end of the transmission link and/or in an intermediate location in order to switch both transmission equipments of a transmission link having bidirectional signal transmission into the test mode.

According to another feature of the invention, the apparatus is particularly characterized in that the line terminal equipment contain synchronous multiplexers and monitoring circuits and the intermediate locations contain synchronous regenerators and monitoring circuits, and in that at least one of the line terminal equipment and at least one following intermediate regenerator has a device for generating auxiliary signals controllable such that the auxiliary signals are formed according to the first formation rule given a normal monitoring mode and are formed according to the second formation rule given the test mode to enable an evaluation of the test result at a central location.

According to another feature of the invention, the apparatus is particularly characterized in that the monitoring circuit is connected to the monitoring circuit arranged at the beginning of the transmission link via a return channel for the transmission of error messages and no noteworthy expense is required.

According to another feature of the invention, the apparatus is characterized in that the return channel belongs to an equipment for in-operation monitoring.

According to another feature of the invention, an intermediate generator is particularly characterized in that the regenerator comprises a device for deriving comparison signals from the received useful signals according to both the first formation rule and the second formation rule and comprises a device for the comparison of the received auxiliary signals to the two, locally-generated comparison signals, and further comprises a control device that activates the first or the second formation rule for the auxiliary signals to be transmitted together with the useful signals, the activation being in accordance with and dependent on the result of the comparison.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a schematic block diagram of a PCM transmission apparatus having two terminals and a plurality of intermediate regenerators; and FIG. 2 is a schematic block diagram of a PCM transmission equipment having two transmission links.

DESCRIPTION OF THE PREFERRED EMBODIMENTS

FIG. 1 illustrates an equipment for the transmission of digital useful signals from a line terminal equipment 1 to a line terminal equipment 4 via a transmission link d.

The line terminal equipment 1 and the line terminal equipment 4 each comprise a monitoring circuit 21, 24, respectively, for bit error recognition in addition to a multiplexer 11 and a demultiplexer 14 respectively. A pair of intermediate locations 2 and 3 are illustrated which each comprise a regenerator 12, 13, respectively, and a monitoring circuit 22, 23, respectively, for bit error recognition. The monitoring circuits 22, 23 and 24 are connected to the monitoring circuit 21 of the line terminal equipment 1 by way of a return channel 9.

The transmission link d comprises regenerator sections a, b, and c, each of which forms a transmission section. For the individual monitoring of these three, successive transmission sections, auxiliary signals are transmitted in addition to the useful signals. The auxiliary signals are respectively derived from the useful signals according to a first formation rule at the start of the regenerator fields a, b or, respectively, c and are inserted into the digital useful signals.

Respective comparison signals according to the first formation rule are derived from the received useful signals at the end of the regenerator section a, b and c. These comparison signals are compared to the received, auxiliary signals. A comparison between received auxiliary signals and locally-formed comparison signals therefore occurs. Error messages are thereby formed in a prescribed dependency on the comparison result and are transmitted to the central monitoring circuit 21 via the return channel 9. The return channel 9 is preferably a component part of a device for in-operation monitoring of the transmission equipment.

The central monitoring circuit 21 comprises a locating device with whose assistance error locations can be located. A check of the monitoring equipment formed by the monitoring circuits, in turn, is carried out in the following manner.

For the transition from the normal monitoring mode to the test mode, the line terminal equipment 1 switches from the first formation rule to a second formation rule in the derivation of the auxiliary signals for a prescribed duration. When the monitoring circuit 22 of the intermediate regenerator 2 recognizes the bit errors connected therewith, it indicates that it is operating in an error-free manner. The monitoring circuit 22 is therefore checked for its operability.

The further transmission section b follows the transmission section a. In order to also be able to switch the transmission section b into the test mode, comparison signals are derived according to both the first formation rule and the second formation rule at the end of the transmission section a and are respectively compared to the received, auxiliary signals. Given the identification of a plurality of auxiliary signals derived according to the second formation rule that follow one another in intermediate succession, a switch is made to the second formation rule in the formation of the auxiliary signals B1 for a prescribed duration in the case of the digital signals to be transmitted via the following transmission section b.

In this manner, a switch is made from the first formation rule to the second formation rule in the derivation of the auxiliary signal B1 from the useful signals during the test mode at the end of each transmission section that precedes a further transmission section Finally, the entire transmission link is in the test mode.

When PCM signals are transmitted with the assistance of the transmission equipment, then the duration during which the auxiliary signals B1 are formed according to the second formation rule is expediently defined by a prescribed plurality n of pulse frames. In this case, the reception of a prescribed plurality of p pulse frame having auxiliary signals of the second type serves as a criterion for the transition to the second formation rule in an intermediate location. What thereby holds true is $p \leq n$. In a preferred designation, $p = n$ and $5 \leq p \leq 8$. Given a pulse frame having the duration of 125 msec, it is then at most, one second until the last of one thousand regenerators connected in a chain has switched into the test mode.

The method can be particularly advantageously employed in a transmission equipment of what is referred to as the synchronous digital hierarchy as known from the CCITT recommendations G707-G709. In this case, the digital transmission link contains a synchronous multiplexer 11 at the beginning of the line and a synchronous demultiplexer 14 at the end of the line and contains synchronous regenerators 2 and 3 intermediate the multiplexers. The recognition of bit errors in the fundamental line sections or, respectively, regenerator sections a, b and c occurs on the basis of parity bits B1 that are newly calculated in each regenerator 12, 13 and are inserted into the data stream Potentially occurring parity errors are counted in the monitoring circuits 22, 23 and 24 and are compared to thresholds and may be potentially converted into alarm reports.

In this case, the auxiliary signals B1 derived according to the first formation rule are parity bytes and the auxiliary signals B1 formed according to the second formation rule are preferably inverted parity bytes of the useful signals. The inverting can potentially relate to a sub-region of the parity byte.

For checking the monitoring circuits 22-24, given error-free transmission, the parity byte B1 is inverted in the synchronous multiplexer 11 of the line terminal equipment 1 at the transmission side, being inverted by a control instruction for the duration of n frames. The receiving, synchronous demultiplexer 12 of the intermediate regenerator 2 thereby recognizes bit errors, reports that bit errors to the central monitoring circuit 21 via the monitoring circuit 22 and the return channel 9 and newly calculates the parity byte B1.

Due to this recalculation of the parity byte B1, the checking of the monitoring circuit of the following intermediate regenerator 3 and of potentially further intermediate regenerators and of the line terminal equipment 4 would not be possible without further measures.

The intermediate regenerator 2, however, comprises a circuit including a comparator and counter that recognizes the p-fold, successive inversion of the parity word B1 incoming at the signal input. In response thereto, the intermediate regenerator 2, in turn, inverts the newly-calculated parity byte B1 for the duration of n frames as well.

The checking of the monitoring circuit 22 of the intermediate regenerator 2 and of potentially further intermediate regenerators and of the receiving line terminal equipment 4 is possible in this manner.

Since the error messages acquired in the monitoring circuits 22-24 are transmitted to the monitoring circuit 21 of the line terminal equipment via the return channel, the bit error rates calculated in the monitoring circuits 22-24 during the test mode are available for further evaluation in the central monitoring circuit 22.

FIG. 2 illustrates an equipment for the transmission of digital useful signals from a line terminal equipment 5 to a line terminal equipment 8 via a transmission link g. The transmission link g is composed of a pair of transmission links e and f each of which can be in the fundamental digital signal line section. Two line terminal signal equipment 6 and 7 are arranged back-to-back in an intermediate location situated between the line terminal equipment 5 and 8. Seen as a whole, the two line terminal equipment 6 and 7 also have the function of an intermediate regenerator in the framework of the transmission path g. For testing the monitoring circuits 25-28 of the line terminal equipment 5 and 8, the method set forth with reference to FIG. 1 is therefore applied with the prescription that the transmission link e and f are viewed as being transmission sections. If the line terminal equipment 6 recognizes a sequence of p inverted parity bytes B2 it causes the line terminal 7 via control lines to transmit inverted parity bytes B2. A transmission of inverted parity bytes B1 can be triggered in a corresponding fashion, by themselves or in addition to the inverted parity bytes B2.

When a transmission equipment of what is referred to as the synchronous digital hierarchy of CCITT recommendations G707-G709 is involved, then the parity byte B2 that is likewise provided therein serves as a potentially inverted auxiliary signal.

FIGS. 1 and 2 show transmission equipment for the transmission of digital signals in one direction. When transmission equipment for signal transmission in the opposite direction are also present, then the monitoring circuits are respectively expediently employed for monitoring the opposite direction at the same time. When, in this case, inverted parity bytes B1 and/or B2 are received at the end of the transmission link, then the line terminal equipment at the receiving side initiates the inversion of the appertaining parity bytes in the opposite direction. Such an inversion of the parity bytes in the opposite direction may also be potentially undertaken in intermediate locations of the transmission link.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method for individually monitoring at least two successive transmission sections of a transmission link for the transmission and reception of useful digital signals, each of the transmission sections including a beginning and an end, whereby auxiliary digital signals are formed according to a first formation rule and are respectively derived from the received useful digital signals at the beginning of the respective transmission sections and are inserted in the useful digital signals, and comparison signals are formed according to the first formation rule and are produced from the received useful digital signals at the respective ends of the transmission sections and are compared to the received auxiliary digital signals to produce a comparison result and error messages are formed with the assistance of monitoring circuits in a prescribed dependency on the comparison result, the improvement comprising the steps of:

for checking the error messages and switching from the first formation rule to a second formation rule for a prescribed duration in the formation of the auxiliary digital signals at the beginnings of at least two individually-monitored transmission sections, forming comparison signals according to the first formation rule and according to the second formation rule at the end of at least one of the transmission sections preceding a further transmission section as viewed with respect to the direction of transmission along the transmission link and comparing the comparison signals to the received auxiliary digital signals; and given identification of auxiliary digital signals formed according to the second formation rule, switching to auxiliary digital signals formed according to the second formation rule for a prescribed interval during a prescribed duration when signals are to be transmitted via the transmission section next following in the direction of transmission along the transmission link.

2. The improved method of claim 1, and further defined as:

forming auxiliary digital signals according to the second formation rule for the duration of a first prescribed plurality of pulse frames; and switching to the second formation rule in a following intermediate location in response to the receipt of a second prescribed plurality of pulse frames having auxiliary digital signals of a second type.

3. The improved method of claim 2, and further defined as:

forming auxiliary digital signals from the first formation rule as parity bytes and auxiliary digital signals from the second formation rule as parity bytes inverted in a sub-region thereof.

4. The improved method of claim 3, and further defined as: switching from the first formation rule to the second formation rule proceeding from a terminal to which the error messages are transmitted.

5. The improved method of claim 4, in a transmission link having bidirectional signal transmission and further defined as:

forming the parity bytes of a transmission direction opposite to the current transmission direction according to the second formation rule in response to receipt of parity bytes formed according to the second formation rule at the end of a transmission link.

6. In apparatus for individually monitoring at least two successive transmission sections of a transmission link between a pair of aligned terminal equipment for the transmission of useful digital signals, each of the transmission sections including a beginning and an end, in which means are provided for forming auxiliary digital signals according to a first formation rule from the useful digital signals at the beginnings of the transmission sections and inserting the auxiliary digital signals into the useful digital signals, and in which means are provided for forming comparison signals according to the first formation rule from the received useful digital signals at the respective ends of the transmission sections, and in which comparison means compare the comparison signals to the received auxiliary digital signals to produce comparison results, and in which monitoring means form error messages in a prescribed dependency on the comparison results, the improvement therein comprising:

for checking the error messages, means for switching from the first formation rule to a second formation rule for a prescribed duration in the formation of the auxiliary digital signals at the beginnings of at least two individually-monitored transmission sections;

means for forming comparison signals according to the first formation rule and according to the second formation rule at the end of at least one of the transmission sections preceding a further transmission section as viewed with respect tot he direction transmission along the transmission link and comparing the comparison signals to the received auxiliary digital signals; and given identification of auxiliary digital signals formed according to the second formation rule, means for switching to auxiliary digital signals formed according to the second formation rule for a prescribed interval during a prescribed duration when digital signals are to be transmitted via the following transmission section as viewed with respect to the direction of transmission along the transmission link.

7. The improved apparatus according to claim 6, and further defined as comprising:

a pair of line terminal equipment each comprising a synchronous multiplexer and a monitoring circuit;

a plurality of intermediate locations connected in series between said line terminal equipment and each including a synchronous regenerator and a monitoring circuit; and at least one of said line terminal equipment and at least one of said intermediate regenerators including a device for generating said auxiliary digital signals according to the first formation rule during a normal operating mode and according to the second formation rule during a test mode.

8. The improved apparatus according to claim 7, and further comprising:
a return channel connecting each of said monitoring circuits to one another for carrying the error messages.

9. The improved apparatus according to claim 8, wherein: said return channel is included in apparatus for in-operation monitoring.

10. The improved apparatus according to claim 8, wherein:
each of said monitoring circuits comprises means for switching from a normal monitoring mode to a test monitoring mode, and means for evaluating messages received over said return channel.

11. The improved apparatus according to claim 8, wherein:
each of said intermediate regenerators comprises means for forming comparison signals from the received useful digital signals according to both the first formation rule and the second formation rule, means for comparing the received auxiliary digital signals to two locally-generated comparison signals, and control means activating the first formation rule or the second formation rule for the auxiliary digital signals to be transmitted together with the useful digital signals in dependence on the comparison.

* * * * *